(12) United States Patent
Hathaway et al.

(10) Patent No.: US 9,280,624 B2
(45) Date of Patent: Mar. 8, 2016

(54) SYSTEM AND METHOD FOR EFFICIENT STATISTICAL TIMING ANALYSIS OF CYCLE TIME INDEPENDENT TESTS

(71) Applicant: International Business Machines Corporation, Armonk, NY (US)

(72) Inventors: David J. Hathaway, Underhill, VT (US); Kerim Kalafala, Rhinebeck, NY (US); Stephen G. Shuma, Underhill, VT (US); Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/264,199

(22) Filed: Apr. 29, 2014

(65) Prior Publication Data

US 2015/0310151 A1   Oct. 29, 2015

(51) Int. Cl.
*G06F 9/455*     (2006.01)
*G06F 17/50*    (2006.01)

(52) U.S. Cl.
CPC ........ *G06F 17/5031* (2013.01); *G06F 2217/84* (2013.01)

(58) Field of Classification Search
USPC .......................................... 716/108
See application file for complete search history.

(56) References Cited

U.S. PATENT DOCUMENTS 7,428,716 B2    9/2008  Visweswariah
2011/0082657 A1*  4/2011  Ito .................................. 702/79
2012/0311514 A1* 12/2012  Lavin et al. .................... 716/108

* cited by examiner

*Primary Examiner* — Paul Dinh
*Assistant Examiner* — Bryce Aisaka
(74) *Attorney, Agent, or Firm* — L. Jeffrey Kelly; Kenneth R. Corsello

(57) ABSTRACT

A method and a system performing selected timing comparisons in a digital electronic design includes propagating from signal sources to timing comparisons of one or multiple signal labels. The signal label includes signal source identifiers and signal path cycle adjust information. Timing comparisons are determined in which signal label values at each input of the timing comparison are required to compute the selected timing comparisons. The propagation back from the timing comparisons are needed signal labels, followed by the propagation and computing timing data from the signal source applied to the propagated signal labels corresponding to the required signal labels.

16 Claims, 5 Drawing Sheets

FIG. 4

| | TIMING GRAPH NODE | IDENTIFIER | TOTAL ADJUST IN LATE MODE | TOTAL ADJUST IN EARLY MODE |
|---|---|---|---|---|
| Level 0 | BOX203/D | N/A | 0 | 0 |
| Level 1 | BOX201/A | C+ | 0 | 0 |
| | BOX201/Z | C+ | 0 | 0 |
| Level 2 | BOX202/A | C+ | 0 | 0 |
| | BOX203/C | C+ | 0 | 0 |
| Level 3 | BOX202/Z | C+ | 0 | 0 |
| | BOX203/L2 | C@L | 0 | 0 |
| Level 4 | BOX205/C | C+ | 0 | 0 |
| | BOX204/A | C@L | 0 | 0 |
| Level 5 | BOX205/L2 | C@L | 0 | 0 |
| | BOX204/Z | C@L | -1 CLOCK PERIOD | -1 CLOCK PERIOD |
| Level 6 | BOX205/D | C@L | -1 CLOCK PERIOD | -1 CLOCK PERIOD |

FIG. 5

| | TIMING GRAPH NODE | IDENTIFIER | LATE VALUE NEEDED FOR PERFORMING CYCLE TIME INDEPENDENT TIMING TEST? | EARLY VALUE NEEDED FOR PERFORMING CYCLE TIME INDEPENDENT TIMING TEST? |
|---|---|---|---|---|
| Level 6 | BOX205/D | C@L | YES | NO |
| | BOX205/L2 | C@L | NO | NO |
| Level 5 | BOX204/Z | C@L | YES | NO |
| Level 4 | BOX205/C | C+ | NO | YES |
| | BOX204/A | C@L | YES | NO |
| Level 3 | BOX202/Z | C+ | NO | YES |
| | BOX203/L2 | C@L | YES | NO |
| Level 2 | BOX202/A | C+ | NO | YES |
| | BOX203/C | C+ | YES | NO |
| Level 1 | BOX201/Z | C+ | YES | YES |
| | BOX203/D | N/A | NO | NO |
| Level 0 | BOX201/A | C+ | YES | YES |

SYSTEM AND METHOD FOR EFFICIENT STATISTICAL TIMING ANALYSIS OF CYCLE TIME INDEPENDENT TESTS

FIELD OF THE INVENTION

The present invention generally relates to the field of Design Automation of semiconductor VLSI chips, and more particularly, to a method and a system providing an efficient statistical timing analysis of cycle time independent tests.

BACKGROUND

An objective of a conventional statistical static timing analysis (SSTA) is to prevent circuit limited yield (CLY) losses by accounting the effects of parametric variability upon switching time distributions of various signals within a digital circuit. SSTA can be performed at a transistor level or at a gate level, using pre-characterized library elements including those at higher levels of abstraction for complex hierarchical chips.

SSTA algorithms are known to operate by way of a first levelizing the logic structure, and breaking any loops in order to create a directed acyclic graph (timing graph). Modern designs can often contain millions of placeable objects, with corresponding timing graphs having millions or tens of millions of nodes. For each node, a corresponding arrival time (AT), transition rate (slew), and required arrival time (RAT) are computed for both rising and falling transitions as well early and late mode analysis. Each value can be represented in general as a distribution, i.e., using a first-order canonical form, wherein timing quantities are represented as functions of underlying sources of variation, as described e.g., in U.S. Pat. No. 7,428,716 to Visweswariah, of common assignee. The arrival time (AT) distribution represents the latest or earliest time at which a signal can transition due to the entire upstream fan-in cone. Similarly, the required arrival time (RAT) distribution represents the latest or earliest time at which a signal must transition due to timing constraints in the entire downstream fan-out cone.

The ATs are propagated forward in a levelized manner, starting from the design primary input asserted (i.e., user-specified) arrival times, and ending at either the primary output ports or the intermediate storage elements. In single fan-in cases, AT sink node=AT source node+delay from source to sink.

Whenever multiple signals merge, each fan-in contributes a potential arrival time computed as AT sink (potential)=AT source+delay, making it possible for the maximum (late mode) or minimum (early mode) of all potential arrival times to be statistically computed at the sink node. Typically, an exact delay function for an edge in a timing graph is not known, but instead only the range of possible delay functions can be determined between some minimum delay and a maximum delay. In this case, maximum delay functions are used to compute the late mode arrival times and minimum delay functions used to compute the early mode arrival times.

A timing test (e.g., setup or a hold check) involves a comparison of arrival times in order to determine if the proper ordering relationships between the corresponding signals are satisfied. Such a comparison of AT values produces a quantity known as slack, which when positive in sign indicates that the timing test has been satisfied (and the margin thereof), whereas a negative value indicates a failing test and potential problem.

Timing tests can be broadly categorized as either clock cycle time dependent or cycle time independent. Cycle time dependent tests are those whose slack is computed as a function of clock cycle time(s). By contrast, cycle time independent tests are those wherein the computed slack value is invariant to underlying clock cycle time(s). Typically, but not always, setup tests are cycle time dependent, as a full clock cycle (or the greatest common divisor of clock cycles) is allowed for an arrival time to propagate from launching to a receiving latch, and therefore, the slack depends on the cycle time(s) of the launch and the capture clocks. Similarly, it is typical for hold tests to be cycle time independent. The aforementioned, however, does not always hold true for setup and hold tests, as various adjusts can be present in the timing graph. For example, in the case of a user specified timing adjust (e.g., equal to a full clock cycle, or a greatest common divisor [GCD] of clock cycles), a setup test can end up becoming a cycle time independent test, and/or a hold test can become cycle time dependent.

In the case of some high-performance digital integrated circuits, at-speed screening is performed, and manufactured products are binned into multiple frequency categories. In such circumstances, during the digital implementation phase, timing engineers can be particularly interested in ensuring that parametric variation does not result in a circuit limited yield (CLY) loss for cycle time independent timing tests. As such, CLY issues can present chip-kill problems that are present regardless of the lowering of the clock frequency. On the other hand, when such screening and binning manufactured products by frequency is possible, the timing engineers can be willing to accept the possibility of CLY loss at a particular target cycle time for cycle time dependent timing tests since the underlying circuits can be able to operate correctly at one of the lower clock frequency bins. In the above situation, it is often the case that timing engineers desire a means to perform SSTA and report the results for cycle time independent tests only.

One prior technique for performing SSTA analysis of cycle time independent tests has traditionally involved a first propagation of full timing data on the entire timing graph (i.e., propagating early and late timing values regardless of whether a value is needed in a downstream cycle time independent test), using an inflated cycle time. The purpose of the inflated cycle time is to move the cycle time dependent tests to a positive slack value, such that only tests which are frequency independent can show up as a negative slack requiring attention from a SSTA closure perspective. However, there are inherent inefficiencies with the prior art when using an inflated cycle time. Most importantly, a full AT and RAT propagation is still required throughout the entire design, regardless of whether a timing quantity is of interest, i.e., needed at a timing test which is frequency independent. This leads to an excessive amount of wasted calculation and an increasing runtime which negatively impacts designer productivity.

In another prior art technique, SSTA is performed on a timing graph (propagating early and late timing values regardless of whether a value is needed in a downstream test), and is followed by generating reports which are filtered based on the test type. For example, using such prior art methods, a timing engineer can select only report hold tests (and exclude setup tests) in order to determine whether there are any violations among cycle time independent tests. The use of filtering of reporting, however, can miss cycle time independent setup cases (such as those involving a user specified timing adjust, as previously described), and can report hold tests which are cycle time independent (e.g., similarly, in a case involving a user specified timing adjust). Furthermore, filtering reports suffers from the same problem of wasted calculations as described above with respect to the prior art method of inflating clock cycle time.

In summary, in a high performance chip design there is a desire to perform statistical timing for the purpose of analyzing frequency independent tests, whereas frequency dependent tests are handled by a separate "nominal" timing run. This differentiation is presently supported by performing a statistical timing run with cycle time uplift such that the cycle time dependent tests have large slack values. The cycle time uplift approach is both cumbersome and leads to wasteful calculation of many statistical timing quantities that are not needed (when such quantities only feed the frequency dependent tests).

Accordingly, there is a need to provide a method and a system capable to achieve an efficient statistical timing analysis of cycle time independent tests.

SUMMARY

In an embodiment, a method and a system are provided to perform a statistical timing analysis wherein timing quantities feeding cycle time dependent tests are identified and filtered using a fast forward and backward propagation marking steps, followed by the propagation of statistical timing only where a value is needed for a downstream cycle time independent test.

In an embodiment, a method is provided to eliminate wasteful calculations, limiting timing calculations and performing significant runtime savings to reduce the number of instances where a full statistical propagation is performed, when it is compared to a method involving cycle time uplift.

In an embodiment, a method of statistical static timing analysis of a digital electronic design includes: a) using a computer, propagating from at least one signal source to at least one timing test at least one signal label, the at last one signal label including at least one of i) at least one signal source identifier, and ii) a signal path cycle adjust information; b) determining at the timing test which of the signal label values at each input of the timing test are needed to compute a selected timing test; c) propagating back from the timing test value needed flags; d) propagating and computing timing data only for the signal labels where the value needed flag is true.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

FIG. 4 shows a table listing nodes of the aforementioned timing graph, and illustrating the propagation from a signal source to a timing comparison having a signal label, the signal label including at least one signal source identifier, and signal path cycle adjust information.

FIG. 5 shows a table listing the nodes of the aforementioned timing graph, illustrating the propagation back from the timing comparisons needed signal labels.

DETAILED DESCRIPTION

The present invention and various features, aspects and advantages thereof are explained more fully with reference to the non-limiting embodiments that are illustrated in the accompanying drawings and detailed in the following description.

GLOSSARY OF TERMS

In order to clarify the meaning of terms recited in the disclosure, a glossary of the terms as defined is added herein below:

Adjust: Modification of a timing quantity typically specified by the application of a timing constraint.

Segment adjust: A particular type of adjust applied to values propagating through a particular edge of the timing graph.

Cumulative adjust: Sum total of adjusts along a path.

Forward propagation: Propagation of values along the direction of directed edges in a timing graph.

Backward propagation: Propagation of values in the direction opposite to directed edges in a timing graph (e.g., propagation from sink node to a source node).

Signal source: A node within a timing graph containing a user-specified arrival time.

Signal source identifier: Phase tag or other flag indicating the signal source of a given arrival time or slew value.

Figure 1:
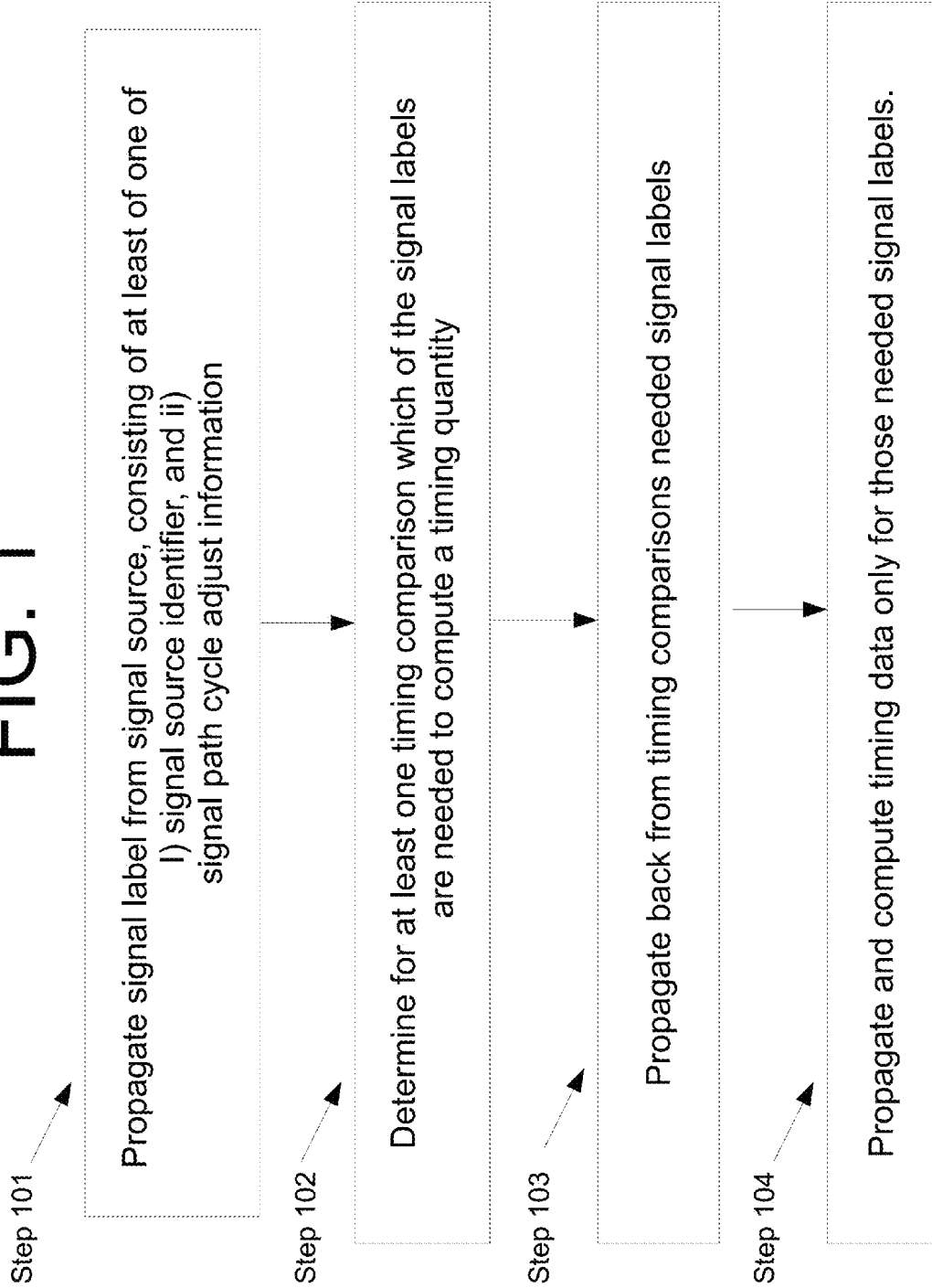
FIG. 1 shows a flowchart illustrating an embodiment of the present invention.

Referring to FIG. 1, an embodiment of the disclosure is illustrated, wherein Step 101 begins with forward propagating from one or more signal sources to one or more timing tests a signal label consisting of at least one signal source identifier, and corresponding cumulative adjust information.

In Step 102, wherein at one or more timing test, a determination is made of which signal labels are required to perform the timing test.

In Step 103, the determination of the signal labels required to perform a timing test is followed by propagating back from at least one timing test value needed flags for signal labels.

In Step 104, the propagation and computation of timing data occurs only for the propagated signal labels where a value is necessitated.

Figure 2:
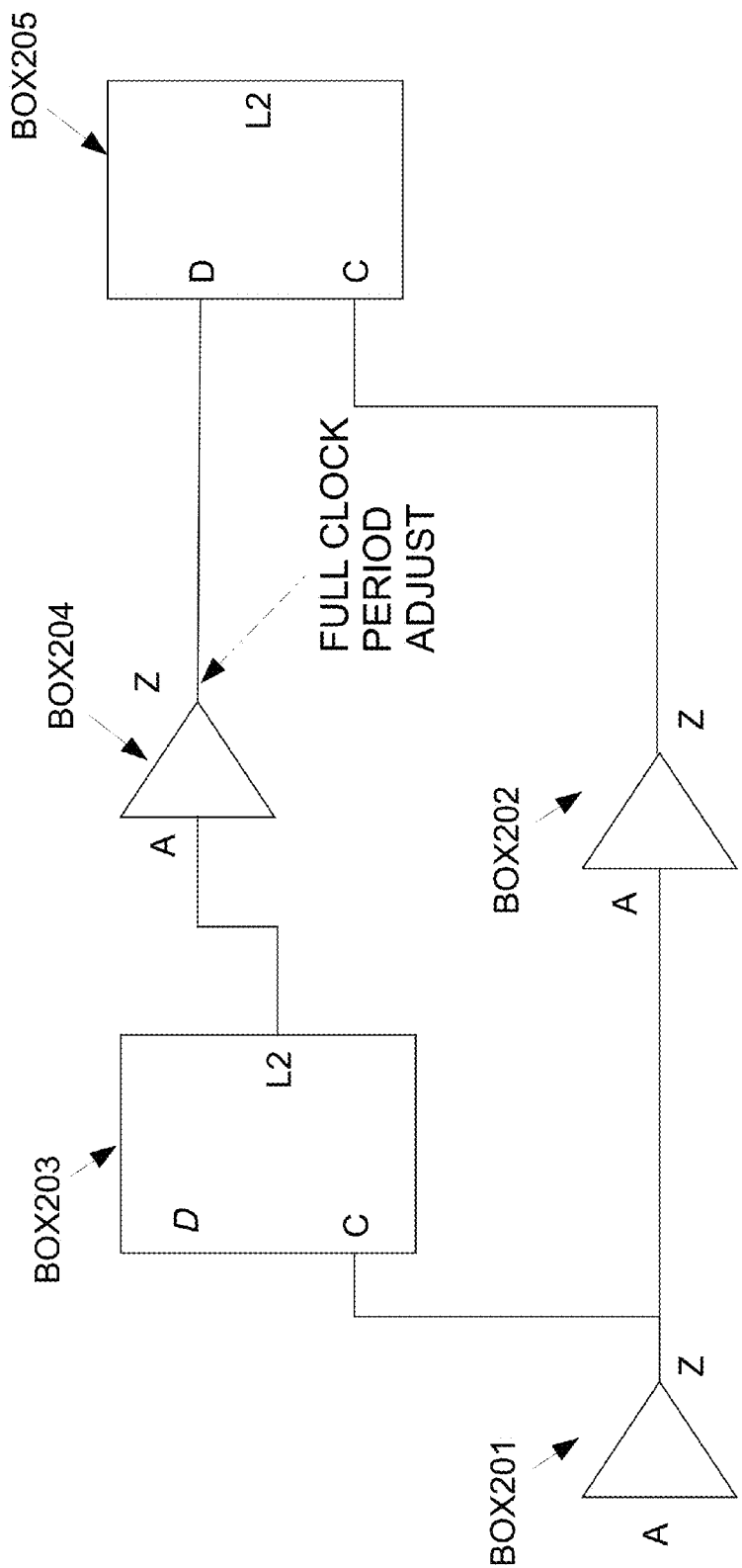
FIG. 2 is an exemplary circuit used to illustrate an embodiment of the present invention.

Referring now to FIG. 2, a non-limiting simple exemplary circuit diagram is shown to illustrate an application of an embodiment. In the simple exemplary illustrative circuit, early and late mode arrival times are assumed to be asserted at the input "A" of box201. For the purpose of clarity, both the output L2 of box205 and the input D box 203 are left as open circuits. Box201 and box202 are buffers that propagate a clock signal to clock inputs of box203 and box205 intending to illustrate edge-sensitive storage elements (e.g., flip-flops). Similarly, box204 depicts a buffer propagating a data signal from the L2 output of box203 to D input of box205.

A user-specified full clock period adjust at the Z output of box204 is shown (in general, such adjust values can be stored on a node, an edge, a path, or any combination thereof, in which an embodiment accommodates all of such forms). For the purpose of simplicity, a full clock period adjust is chosen in the illustrative example, although in an embodiment it can be applied in the presence of arbitrary timing adjusts. The value of individual adjusts need not to be exactly equal to the clock period, e.g., multiple adjusts can accumulate along a path that taken together, add to the greatest common divisor GCD of the launch and capture clock cycles.

Figure 3:
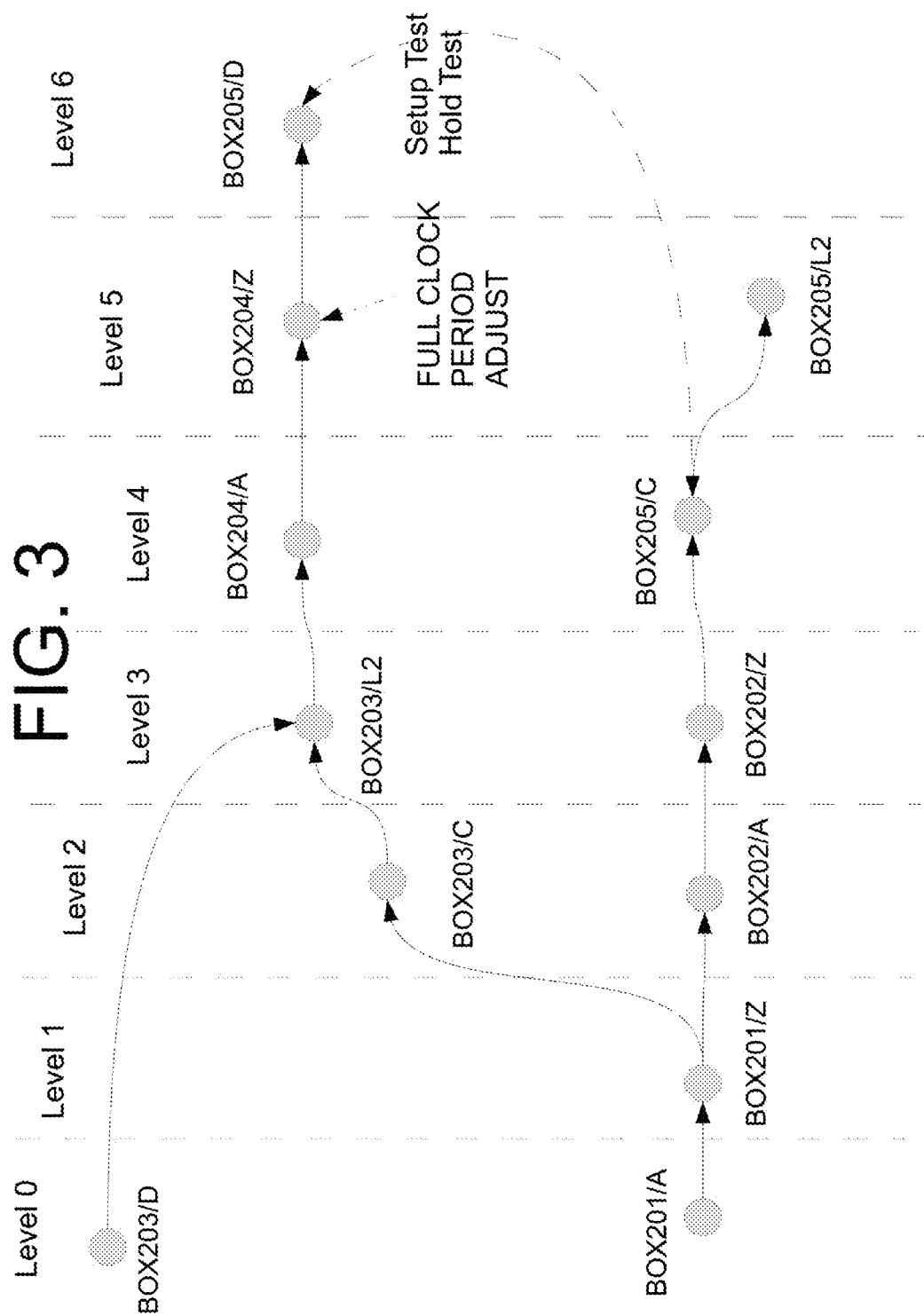
FIG. 3 depicts a forward-levelized timing graph applied to the aforementioned exemplary circuit.

Referring to FIG. 3, a forward levelized timing graph representation of the above simple non-limiting illustrative circuit is shown. Such a timing graph is typically constructed ahead of the propagating timing information, although it can also occur in concert with the propagation of any timing flags or values. Multiple timing tests (i.e., setup and hold) are depicted between input box205/D and box205/C.

Referring to FIG. 4, the resulting signal labels are obtained when applying the aforementioned Step 101 of FIG. 1 previously described, as applied to the timing graph of the exemplary circuit. In a simple non-limiting illustration it as assumed that the asserted arrival time at box201/A is cycle time independent. Therefore, a value of zero cycle adjust propagates forward from box201/A. In an embodiment, all general cases are asserted where arrival times can themselves be cycle time dependent and consequently, a non-zero cycle adjust value can immediately begin propagating forward from the asserted signal source(s). The value of a zero total adjust continues to propagate forward until a user-specified timing adjust of one clock cycle is encountered at box204/Z. It is worth noting that adjusts are recorded for both the early and the late mode transitions. For the purpose of simplicity, in the non-limiting example, the same user-specified adjust value is shown to be applied in both the early and late modes, where distinctions between the rise and fall transitions have been omitted. An embodiment of the disclosure can accommodate all the general cases where unique adjust values are propagated for early and late modes, and where unique adjusts are propagated for the rise and the fall transitions thereof. Furthermore, in the simple exemplary illustration, for the purpose of determining a signal source label, a single synchronous clock domain referenced as "C" is assumed. Nonetheless, an embodiment of the present invention accommodates all the generalizations of signal source labels, including propagation of multiple such labels, e.g., in order to store timing values unique to multiple synchronous clock domains per graph node, unique labels for the early versus the late mode and unique labels for rising and falling transitions thereof.

For further illustration, in a non-limiting example shown in FIG. 4 it is assumed that the signal labels are forward propagated in a breadth-first forward propagated fashion. There are multiple ways of forward the propagating information in the levelized graph, and an embodiment accommodates all possible forward propagation methods, including demand-driven (i.e., propagation to a specific node of interest), and all combinations of depth and breadth-first traversal. During the propagation of signal labels, it is possible to encounter a graph node which has multiple incoming edges (e.g., FIG. 3 box203/L2). When multiple incoming edges are present, the union of signal labels is retained.

FIG. 5 illustrates the application of Steps 102 and 103 of FIG. 1 previously described, to the timing graph of the exemplary circuit. In the present example, FIG. 1 Step 102 applies to nodes box205/D and box205/C that are involved in both setup and hold tests with respect to each other.

Focusing first on the setup test case, the general slack equation for a setup test is SLACK=EARLY CLOCK AT−LATE DATA AT+CYCLE ADJUST.

Applying to the aforementioned nodes, SLACK=EARLY AT (205/C)−LATE AT (205/D)+CYCLE ADJUST (ONE CLOCK PERIOD)

Referring back to FIG. 4, it has been determined that box205/D has a cumulative adjust of −1 clock period, whereas box205/C has zero cumulative adjust. Plugging adjusts in the aforementioned setup slack equation, it is evident that the setup test between box205/D and box205/C is a cycle time independent (since adjust −1 clock period for box205/D cancels out the CYCLE ADJUST +1 clock period in the setup slack equation above). Therefore, the LATE mode AT value for box205/D is required for a cycle time independent test (e.g., for the setup test against box205/C), and the same can be for the EARLY mode AT value for box205/C.

Focusing next on a hold test case, the general slack equation for the hold test is SLACK=EARLY DATA AT−LATE CLOCK. Applying to the aforementioned nodes, SLACK=EARLY AT((205/D)−LATE AT (205/C).

Referring back to FIG. 4, it is determined that box205/D has a cumulative adjust −1 cycle, whereas box205/C has zero cumulative adjust. Plugging adjusts to the hold slack equation above, it is evident that the hold test between box205/D and box205/C is cycle time dependent (i.e., the slack will vary as a function of clock cycle time due to the fact that the EARLY AT for box205/D has a cycle time dependent adjust). Therefore, the EARLY mode AT value for box205/D is not required for a cycle time independent test (i.e., the only test that the EARLY mode AT for box205/D is involved with is a hold test, and as described previously, the particular hold test is cycle time dependent). The same applies to the LATE mode AT value for box205/C.

Still referring back to FIG. 1, Step 103 applies to all predecessor nodes of box205/D and 205/C by back-propagating "AT needed for a downstream cycle time independent test" values (abbreviated "AT needed" hereinafter), resulting in a remainder of the values shown in FIG. 5. Generally, for any node having at least one outgoing edge, test edge, the "AT needed" flag is set to true if at least one outgoing edge propagates an "AT needed" value of true, or at least one test contributes an "AT needed" value of true, in accordance with the embodiment related to FIG. 1, Step 102. Otherwise, if no outgoing edge propagates an "AT needed" value true, and neither does any test, the "AT needed" flag is set false, as is the case for box205/L2 in the aforementioned example. If multiple signal labels propagate in accordance with FIG. 1 Step 101, then each signal label is assigned its own "AT needed" flag, in accordance with FIG. 1 Step 103 and the aforementioned description.

It should be noted that while the example above referred to specific instances of setup and hold tests, the present invention accommodates all timing tests, including same mode tests, domino tests, tests involving multiple clock domains, tests involving user specified constraints on the alignment of launch and capture edges, user-specified tests, domino tests, tests within abstracted library elements, asserted arrival time constraints, point to point delay constraints, skew tests, window tests, and any combination thereof. Furthermore, while the example above focused on indentifying cycle time independent tests for statistical timing analysis, the present invention also accommodates the identification of cycle time independent tests performed during product stress testing, as well as for identifying cycle time dependent tests. And furthermore, in cases involving multiple synchronous clock domains, the present invention also accommodates excluding tests between pairs of non-synchronous clocks, and marking corresponding AT values as "value needed" false where non-synchronous relationships disable a timing test.

Additionally, with reference to the example above, timing data (including statistical AT, slew and delay values) are propagated and computed only for those signal identifiers for which an "AT needed" flag is set to true.

Moreover, the aforementioned steps can be performed in an incremental fashion, i.e., causing signal labels and value needed flags to be updated in response to a design change, after an initial timing propagation has occurred. For example, if a new adjust is added, cumulative adjust values can be updated, which in turn may cause "value needed" flags to change based on new cumulative adjusts propagating to tests. Similarly, the introduction of new test points may result in additional "value needed" propagations. And similarly, changes in timing graph topology can cause changes in both signal labels and "value needed" flags. Such incremental propagation may occur through well-known means, such as the use of delta lists and queues, which can be further processed using well-known techniques of level-limiting to minimize recalculation efforts.

Finally, the present invention can be realized in hardware, software, or a combination of hardware and software. The present invention can further be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

Embodiments of the disclosure can be embedded in a computer program product, which includes all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply this invention in many obvious ways. In the embodiments described herein, for purposes of clarity, rising and falling timing quantities were not differentiated, but one of ordinary skill in the art could apply the present invention to a situation with different rising and falling delays, slews, ATs and RATs. Embodiments of the invention apply to any type of static timing analysis, including but are not limited to both deterministic (e.g., single corner) and statistical timing of gate-level circuits, transistor-level circuits, hierarchical circuits, circuits with combinational logic, circuits with sequential logic, timing in the presence of coupling noise, timing in the presence of multiple-input switching, timing in the presence of arbitrary timing tests such as setup, hold, end-of-cycle, pulse width, clock gating and loop-cut tests, and timing in the presence of multiple clock domains. It is also evident that many alternatives, modifications and variations will be apparent to those skilled in the art in light of the present description.

It is therefore contemplated that the appended claims will embrace any such alternatives, modifications and variations as falling within the true scope and spirit of the present invention.

What is claimed is:

1. A method of statistical static timing analysis (SSTA) of a digital electronic design, comprising:
propagating, using a computer, a signal label from a signal source to a cycle time dependent timing test, the signal label comprising at least one of:
a signal source identifier, and
a signal path cycle adjust information;
identifying, at each input of the cycle time dependent timing test, which timing values of the signal label are needed to compute a downstream cycle time independent timing test;
propagating back from the cycle time dependent timing test to the signal source a flag indicating the identified timing values of the signal label needed to compute the downstream cycle time independent timing test; and
computing timing data only for the identified values of the signal label which are needed to compute the downstream cycle time independent timing test.

2. The method of claim 1, wherein the signal path cycle adjust information includes a cumulative cycle adjust quantity.

3. The method of claim 2, wherein the cumulative cycle adjust quantity comprises at least one segment adjust quantity.

4. The method of claim 2, wherein propagating the signal label further comprises storing on a node a union of the signal label propagated to the node from predecessor nodes.

5. The method of claim 4, further comprising:
computing a unique flag indicating the identified timing values of the signal label needed to compute the downstream cycle time independent timing test for each signal label among the union of corresponding signal labels.

6. The method of claim 1, wherein the downstream cycle time independent timing test further comprises cycle time independent timing tests performed during a product stress testing.

7. The method of claim 1, further comprising: specifying, by the signal source identifier, a synchronous domain to identify the signal source.

8. The method of claim 1, wherein the downstream cycle time independent timing test excludes comparisons between signal labels comprising different synchronous domain specifications.

9. The method of claim 1, wherein the cycle time dependent timing test comprises same mode tests, domino tests, tests involving multiple clock domains, user-specified tests, tests within abstracted library elements, asserted arrival time constraints, point to point delay constraints, skew tests, window tests, and any combination thereof.

10. The method of claim 1, wherein propagating back the flag indicating the identified timing values of the signal label needed to compute the downstream cycle time independent timing test further comprises:
propagating, by at least one outgoing edge, a flag set to true for a given node.

11. The method of claim 1, wherein propagating back the flag indicating the identified timing values of the signal label needed to compute the downstream cycle time independent timing test further comprises:
propagating, by at least one test, a flag set to true for a given node.

12. The method of claim 1, wherein propagating back the flag indicating the identified timing values of the signal label needed to compute the downstream cycle time independent timing test further comprises:
setting the flag as false when no outgoing edge propagates an arrival time (AT) needed value set as true for a given node.

13. The method of claim 1, wherein the timing data comprises statistical AT, slew and delay values.

14. The method of claim 1, wherein the signal label and the flag indicating the identified timing values of the signal label needed to compute the downstream cycle time independent timing test are incrementally re-propagated responsive to at least one design change.

15. The method of claim 14, wherein the at least one design change comprises at least one of a topological change to a timing graph, an introduction of at least one new timing test, and a modification of adjust values.

16. The method of claim 15, further comprising:
introducing new test points resulting in additional value needed propagations; and changing the timing graph topology causing changes in the signal label and the flag indicating the identified timing values of the signal label needed to compute the downstream cycle time independent timing test.

* * * * *